(12) United States Patent
Amin

(10) Patent No.: US 7,113,012 B2
(45) Date of Patent: Sep. 26, 2006

(54) SKEW DELAY COMPENSATOR

(76) Inventor: Bhavik Amin, 8 Cherryfield, Ashleigh Wood, Castleroy, Limerick (IE)

( * ) Notice: Subject to any disclaimer, the term of this patent is extended or adjusted under 35 U.S.C. 154(b) by 0 days.

(21) Appl. No.: 10/499,602

(22) PCT Filed: Dec. 20, 2001

(86) PCT No.: PCT/DK01/00858

§ 371 (c)(1),
(2), (4) Date: Jun. 16, 2004

(87) PCT Pub. No.: WO03/055094

PCT Pub. Date: Jul. 3, 2003

(65) Prior Publication Data

US 2005/0024109 A1    Feb. 3, 2005

(51) Int. Cl.
*H03L 7/00* (2006.01)
(52) U.S. Cl. ........................ 327/161; 327/158
(58) Field of Classification Search ................ 327/149, 327/153, 158, 161; 331/17, 25, 12; 375/373, 375/375, 376
See application file for complete search history.

(56) References Cited

U.S. PATENT DOCUMENTS 5,451,894 A * 9/1995 Guo ........................... 327/241
6,071,239 A * 6/2000 Cribbs et al. ............... 600/439
6,335,647 B1    1/2002 Nagano ....................... 327/161
6,804,788 B1 * 10/2004 Lubomirsky et al. ....... 713/300

FOREIGN PATENT DOCUMENTS

EP          0499174        8/1992

OTHER PUBLICATIONS

International Search Report; PCT/DK01/00858; Sep. 26, 2002.

* cited by examiner

*Primary Examiner*—Linh My Nguyen
(74) *Attorney, Agent, or Firm*—Cantor Colburn LLP

(57) ABSTRACT

A skew delay compensator is provided including at least two communication interfaces, at least two conductors connected to the communication interfaces, adjustable delay lines connected to the communication interfaces detecting means for measuring propagation delay indicative parameters of the at least two conductors, means for automatic adjustment of at least one adjustable delay line on the basis of the measured propagation delay indicative parameters so that the mutual delay between the at least two conductors is minimized.

20 Claims, 6 Drawing Sheets

SKEW DELAY COMPENSATOR

FIELD OF THE INVENTION

The present invention relates to a skew delay compensator, an extender system and a method of calibrating a delay line.

BACKGROUND OF THE INVENTION

Generally, many types of signals are transmitted via multi-conductors and in many different kinds of applications.

A problem with transmission of analogue signals, e.g. video signals, via multi-conductor twisted cabling, such as standard Cat 5/6 cables, is that such cables are typically optimized for transmission of data signals and not suited for transmission of analogue data signals at all.

This problem may for example be encountered at a remote video monitor on which video signals transmitted via data cables may suffer from signal/image degradation, sometimes to a marked degree.

The invention generally facilitates transmission of video signals, e.g. RGB video signals, via multi-conductor cables, for example twisted pairs of cables in such a way that the above-described distortion or feathering is eliminated.

SUMMARY OF THE INVENTION

The invention relates to a skew delay compensator comprising at least two communication interfaces (211, 221), at least two conductors (3001, 3002, 3003) connected to said communication interfaces (211, 221), adjustable delay lines (DL1, DL2, DL3) connected to said communication interfaces (211, 221), detecting means (DD) for measuring propagation delay indicative parameters of the at least two conductors (3001, 3002, 3003), means (MP) for automatic adjustment of at least one adjustable delay line (DL1, DL2, DL3) on the basis of said measured propagation delay indicative parameters so that the mutual delay between the at least two conductors (3001, 3002, 3003) is minimized.

According to the invention, it is now possible to transmit analogue signals, e.g. video signals, via standard data transmission multi-conductor cables without compromising the synchronism of the involved signals.

Hence, signal degradation results in skew delays, i.e. the difference in the propagation delay between for example R (R:Red), G (G:Green) and B (B:Blue) signal pairs of an applied multi-conductor cable, e.g. a Cat 5/6 cable.

It should be noted that automatic delay setting according to one embodiment of the invention is extremely advantageous in a typical KVM (KVM: Keyboard, Video, Mouse) extender environment since KVM installation is typically performed by personnel skilled within the field of computer hardware. However, it is not very likely that such a person is able to perform manual calibration if such calibration, when being performed manually, requires skills within the field of analogue transmission.

According to the invention, standard data transmission cables may be applied for KVM-extending purposes, thereby avoiding the need of new dedicated wiring by means of special cables, e.g. COAX, having the desired analogue transmission properties.

The importance of this is evident because standard data transmission cables are typically the only kind of cable available at the premises.

Another advantage is the relatively low price of structured cabling (another word for data transmission cabling or cat5/cat6) compared to for example coax.

In this connection, it should be mentioned that installing COAX cables for for example VGA transmission is much more difficult than installing Cat 5/6 cables due to the nature of the connectors.

It should be noted that the detection means for measuring the propagation delay indicative parameters of the at least two conductors may perform such measuring in several different ways within the scope of the invention. Measuring the propagation delay indicative parameters may for example involve establishment of distinct relative measures of the propagation delays between the relevant conductors. According to another embodiment of the invention, the propagation delay indicative parameters may for example comprises simple "who is first"-estimates, which may for example be applied for iterative adjustment of the delay lines until the differences are within certain predefined acceptable tolerances. Evidently, the measures may also be established in several other ways within the scope of the invention.

It should be emphasized that the invention may be applied for several other purposes than KVM extenders. Any use of analogue transmission over more than one twisted pair with a propagation delay discrepancy will experience an improvement of the signal quality by utilizing an automatic skew compensator according to the invention. A further application may for example comprise multi channel audio transmission over two or several twisted pairs.

Another advantage of the invention is that the utilization of automatic skew delay makes analogue transmission over twisted pairs of cables over Cat 5 possible at greater distances than 300 meters.

According to the invention, automatic adjustment facilitates significant advantages over calibration of parallel transmission of signals, e.g. video signals.

When automatic adjustment is performed upon manual activation of the skew delay compensator, a further advantageous embodiment of the invention has been obtained.

When automatic adjustment is performed according to predefined calibration routines stored in said skew delay compensator, a further advantageous embodiment of the invention has been obtained.

When the adjustable delay lines are adjusted by comparison iterations of the mutual delays between said at least two conductors (3001, 3002. 3003) and the adjustable variable delay lines (DL1, DL2, DL3), a further advantageous embodiment of the invention has been obtained.

When the adjustable delay lines are adjusted on the basis of specific propagation delays of at least two of said delay lines and the specifically measured propagation delays of at least two of said connected conductors, a further advantageous embodiment of the invention has been obtained.

When the compensator comprises at least one test oscillator (TO) adapted for transmission of a test signal by at least two connected conductors and at least one detector DD adapted for measuring the absolute or relative delay-representing parameters associated with said at least two connected conductors, a further advantageous embodiment of the invention has been obtained.

When the variable delay lines may be adjusted within a delay interval of at least zero nanoseconds to 50 nanoseconds, preferably at least 200 nanoseconds, and even more preferably at least 300 nanoseconds, a further advantageous embodiment of the invention has been obtained.

When the variable delay comprises a series of delay line modules (LC) comprising output taps (45, 46, 47, 48, 49) wherein the variable delay line properties are obtained by means of switches (SWWn, SWn+1, SWn+3, . . . ) coupled to the taps (45, 46, 47, 48, 49) said switches (SWWn, SWn+1, SWn+3, . . . ) being controlled by at least one microprocessor arrangement (MP) on the basis of said measured propagation delay indicative parameters, a further advantageous embodiment of the invention has been obtained.

When the delay line modules comprise at least one inductive component (L) and at least one capacitive component (C), a further advantageous embodiment of the invention has been obtained.

Evidently, delay line modules may be established in a variety of ways within the scope of the invention, both as analogue delay lines (as stated above) and in some applications even by means of digitally implemented delay lines.

The variations within the scope of the invention depend on the application and the desired properties, i.e. quality, manufacturing costs, etc.

When at least two of the delay line modules, and preferably all, feature a propagation delay of 0.5 to 5 nanoseconds, and preferably a propagation delay of 1 to 2 nanoseconds, a further advantageous embodiment of the invention has been obtained.

When said delay line modules form an adjustable delay line which may be adjusted within a certain desired range, preferably within a complete delay interval of at least zero nanoseconds to 100 nanoseconds, in intervals determined by delay line modules of 0.5 to 5 nanoseconds, preferably a propagation delay of 1 to 2 nanoseconds, a further advantageous embodiment of the invention has been obtained.

Evidently, the delay line interval may be expanded within the scope of the invention to be adjusted within a complete delay interval of zero nanoseconds to for example 200 nanoseconds or even more.

Moreover, the intervals may be adjusted to covering delay line modules of less than 0.5 nanoseconds, e.g. 0.1 nanoseconds, or even smaller delays.

The variations within the scope of the invention depend on the application and the desired properties, i.e. quality, manufacturing costs, etc.

When the predefined acceptable tolerance level for minimizing the mutual delay between the at least two conductors is less than 6 nanoseconds, preferably less than 2 nanoseconds and even more preferably less than 1 nanosecond, a further advantageous embodiment of the invention has been obtained.

When said conductors comprise conductor pairs, a further advantageous embodiment of the invention has been obtained.

Conductor pairs may typically be applied for balanced transmission of signals, e.g. video signals, audio signals.

According to a very preferred embodiment of the invention, automatic delay compensation is performed on video signals.

When said conductors comprise at least two different single conductors sharing at least one return conductor, a further advantageous embodiment of the invention has been obtained.

The invention may also be applied for transmission of single ended signals.

According to an embodiment of the invention, the return path may for example comprise a common grounding.

The present invention further relates to a method of compensating for skew delays in a multi conductor (300) comprising at least two conductors (3001, 3002, 3003), said method comprising the steps of automatically minimizing the mutual delay between said at least two conductors according to predefined, data processor executable routines.

When said compensation for skew delay in a multi conductor (300) comprising at least two conductors (3001, 3002, 3003) comprises the steps of establishing propagation delay indicative parameters of said at least two conductors, and adjusting at least one of at least two adjustable delay lines (DL1, DL2, DL3) connected to said at least two conductors according to predefined, data processor executable routines on the basis of said established propagation delay indicative parameters, so that the mutual delay between said at least two conductors is minimized, a further advantageous embodiment of the invention has been obtained.

THE DRAWINGS

The invention will be described below with reference to the drawings, where

Figure 3:
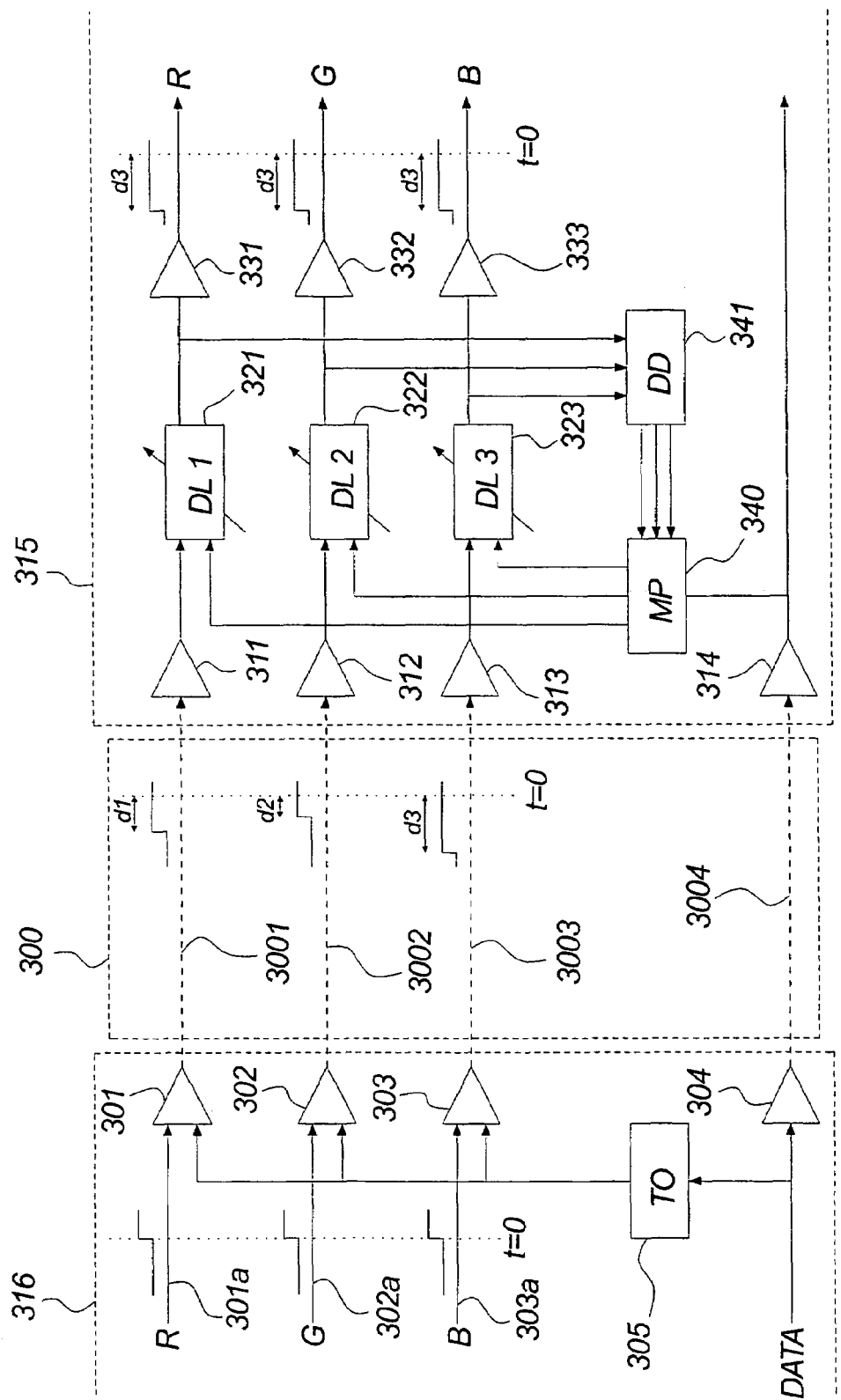
Figure 4A:
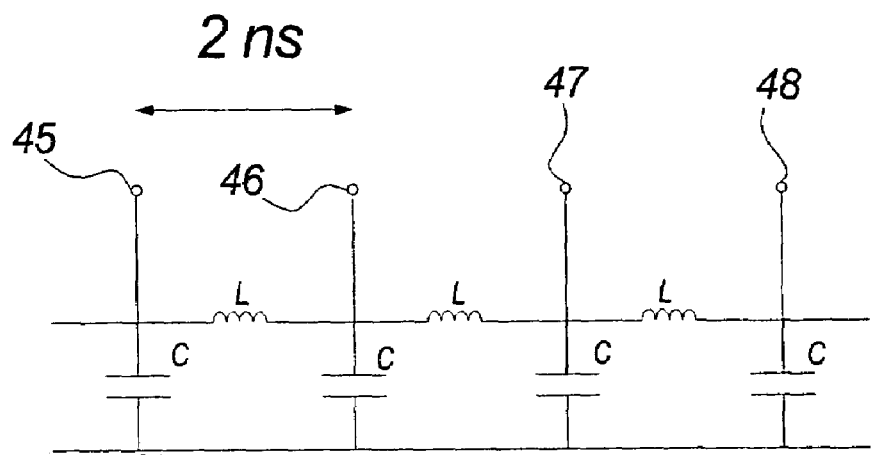
Figure 4B:
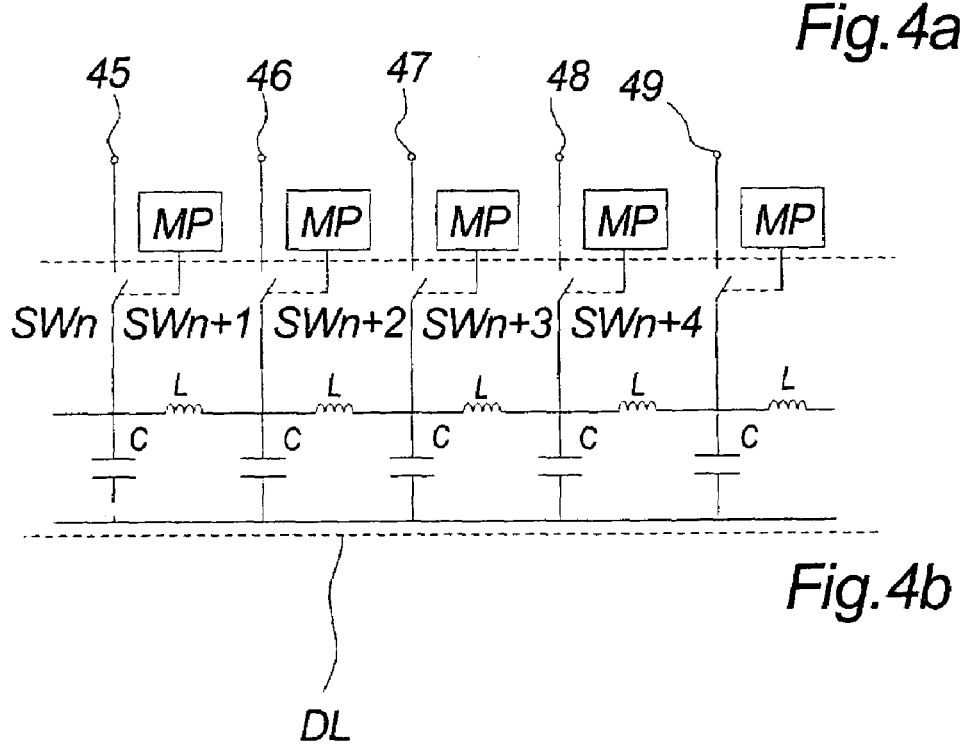
Figure 5A:
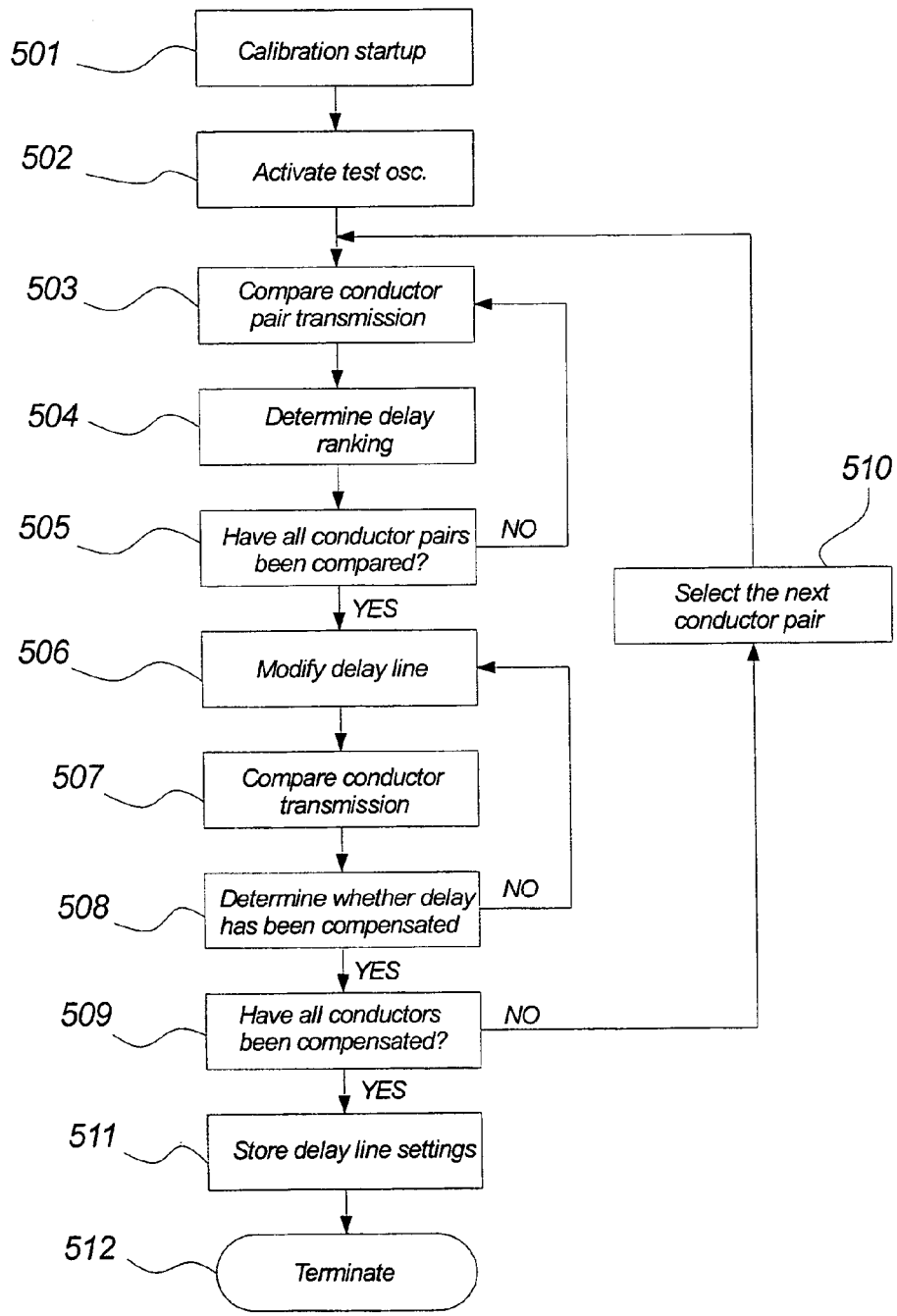
Figure 5B:
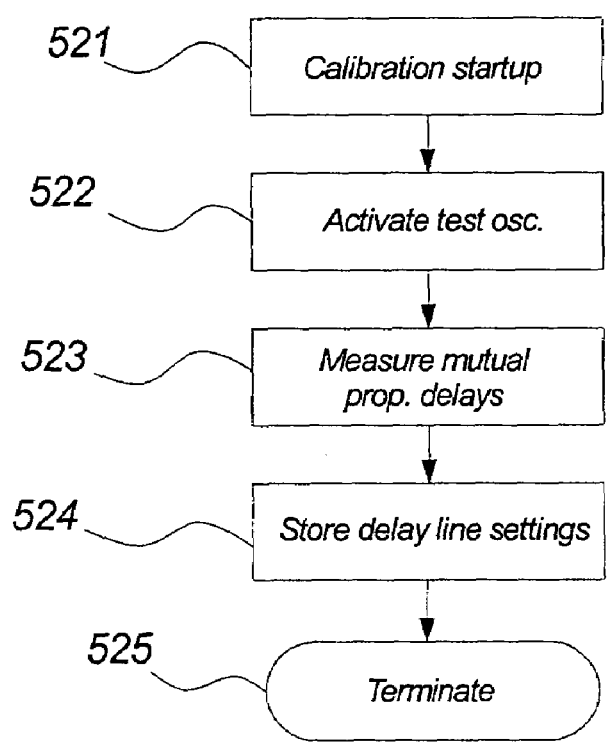
Figure 6:
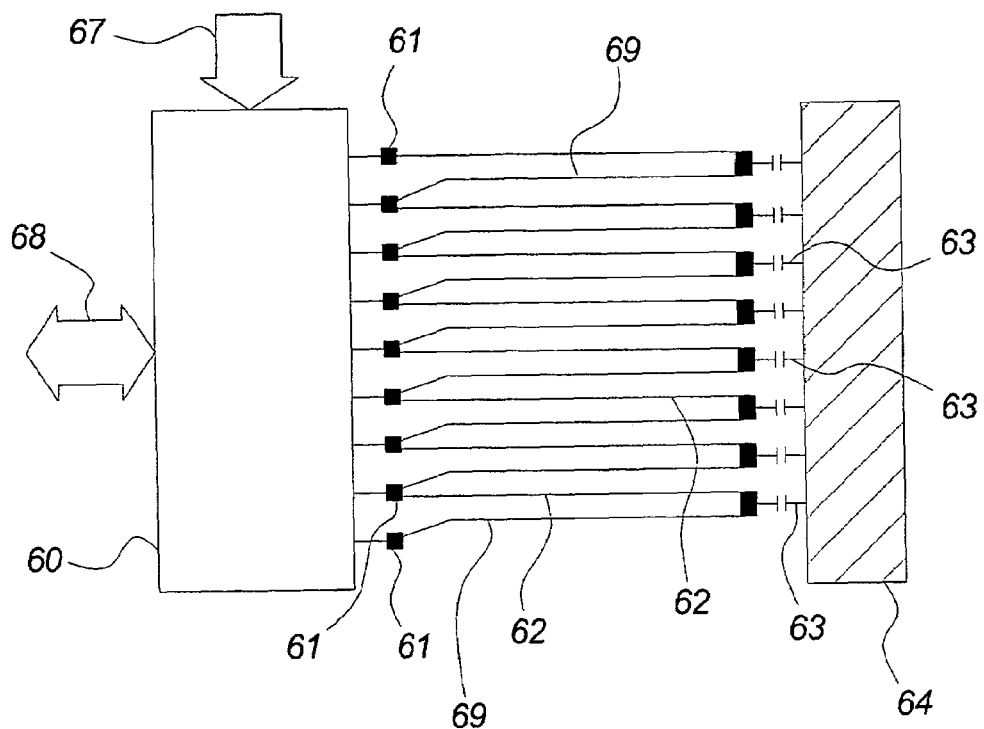

FIG. 3 illustrates a schematic diagram of automatic calibration means according to an embodiment of the invention, FIGS. 4a and 4b illustrate a possible layout of a variable delay line according to an embodiment of the invention, FIGS. 5a and 5b show flowcharts of possible calibration procedures within the scope of the invention, and FIG. 6 illustrates a possible physical establishments of delay line according to an embodiment of the invention.

DETAILED DESCRIPTION

Figure 1:
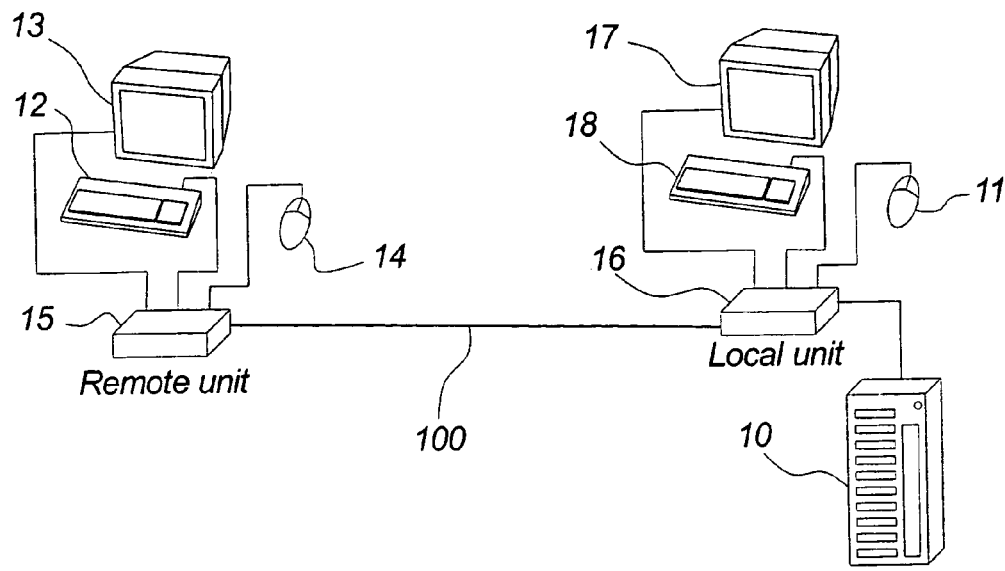
FIG. 1 illustrates a preferred embodiment of the invention.

FIG. 1 illustrates a preferred embodiment of the present invention, namely within the field of so-called KVM extenders (KVM: Keyboard, Video, Mouse).

The illustrated extender system comprises a "dummy" system of a keyboard 12, monitor 13 and mouse 14 connected to a remote unit 15.

The remote unit 15 communicates with a local unit 16 via a cable 100 connection. The local unit 16 is connected to a monitor 17, a keyboard 18, a mouse 19 and a computer 10.

Basically, the above illustrated system facilitates communication of KVM signals via the remote and local units 15, 16 to a computer 10 hosting both terminals.

In this way, the communication traffic between the seats 12, 13, 14, 15; 16, 17, 18, 19 and the hosting computer may be reduced to KVM signals only, thereby avoiding de-central data processing.

Again, it should be emphasized that the invention may be applied for several other purposes than KVM extenders. Any use of analogue transmission over more than one twisted pair with a propagation delay discrepancy will experience an improvement of the signal quality by utilizing an automatic skew compensator according to the invention. A further application may for example comprise multi channel audio transmission over two or several twisted pairs.

The cable connection may for example comprise an UTP connection, such as Cat 5 cables.

Evidently, the terms "remote unit" and "local unit" are to be perceived as broad terms used interchangeably with equivalent terms within the technical field.

Basically, a remote unit should be regarded as a "work station" which may be located at a distance from the data processing equipment, and by means of which transmission between the data processing equipment is wholly or partly reduced to comprising user interface signals, such as digital or analogue signals to and from computer input devices and monitor representative signals.

An example of a prior art system of the above-described kind is Dakota Voyager 300 UTP.

Such a system supports the use of traditional mouse and keyboards.

Such a system also facilitates operation of a remote unit 15 from up to 300 meters away from the connected local unit 16 with a Cat 5 UTP.

The video resolution which may be obtained during operation may for example be approximately 1600*1200 dpi non-interlaced 85 Hz over a distance of up to approx. 100 m UTP.

A problem with the above-described system is that the available cable, e.g. the above described UTP cable, is basically adapted for data transmission (more specifically of packet-switched data) and not for analogue video transmission.

Evidently, this problem increases with the operation distance.

More surprisingly, this problem increases rather than decreases with new generations of data transmission cables, such as Cat 5E and Cat6.

According to a preferred embodiment of the invention, the above-illustrated system further comprises automatic calibration equipment adapted for calibration of the actual signal transmission to the available cable.

Figure 2A:
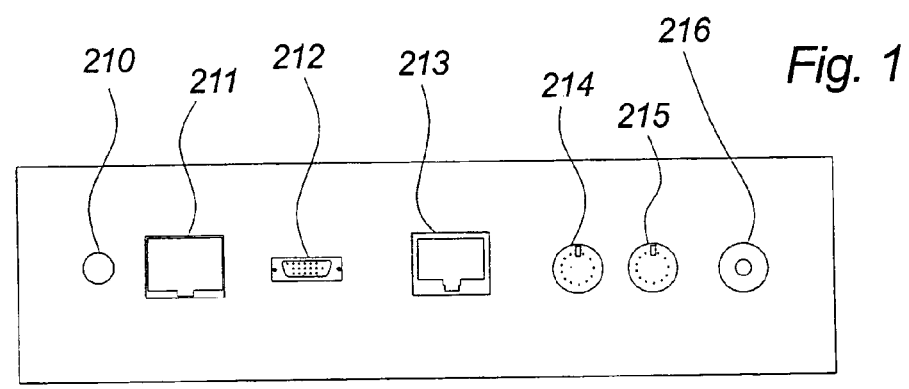
FIGS. 2a and 2b show the rear panel of the above-described embodiment of the invention.

FIG. 2a illustrates a possible rear panel of a remote unit 15 according to an embodiment of the invention.

The illustrated remote unit comprises a calibration push button 210 which initiates automatic calibration when activated to a multi-conductor transmission cable connected to a UTP socket 211 of the remote unit 15 and to a corresponding signal interface of the local unit, e.g. a UTP socket 221 of FIG. 4b.

An alternative embodiment falling within the scope of the invention would for example be automatic calibration during or after power up.

The remote unit 15 comprises standard sockets 212, 214 and 215 adapted for connection of for example the monitor 13, the keyboard 12 and mouse 14, respectively.

A power supply 216 is also provided.

Moreover, the remote unit 15 offers a flash connection by means of a socket 213. This connection is used for updating the firmware of the extender.

Figure 2B:
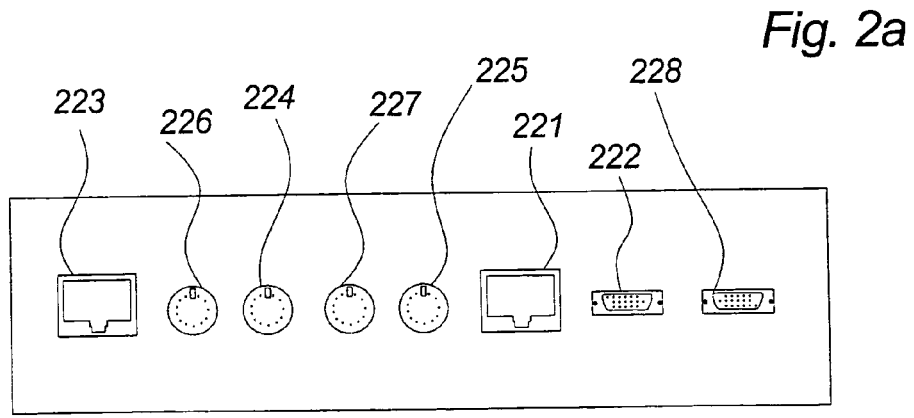

FIG. 2b illustrates a possible rear panel of a local unit 15 according to an embodiment of the invention.

The local unit 16 comprises standard sockets 222, 224 and 225 adapted for connection of for example the monitor 17, the keyboard 18 and mouse 19, respectively.

Moreover, the local unit 16 comprises standard sockets 228, 226 and 227 adapted for connection from the CPU of the locals unit to a user interface comprising a monitor, mouse and keyboard.

Moreover, the local unit 16 offers a flash connection by means of a socket 223 by means of which the local unit's firmware may be upgraded.

FIG. 3 illustrates a schematic diagram of a preferred embodiment of the invention.

The illustrated embodiment comprises different technical features distributed between the above-described remote unit 15 and the local unit 16.

Accordingly, the illustrated embodiment comprises one of many possible calibration arrangements falling within the scope of the invention.

The first part, here arranged upstream in a local unit 316, is arranged as part of a KVM output from the local unit 316. The arrangement comprises three buffer amplifiers 301, 302, 303 at the output end 301a, 302a, 303a of the local unit. The three buffer amplifiers 301, 302, 303 feed a multi-conductor cable 300 coupled herewith which comprises a number of conductor pairs 3001, 3002, 3003, and 3004. The multi-conductor cable 300 is connected downstream to buffer amplifiers 311, 312, 313. The output of these buffer amplifiers 311, 312, 313 may be fed to variable delay lines 321, 322, 323 (DL1, DL2, DL3). Moreover, the outputs of the variable delay lines 321, 322, 323 are connected to buffer amplifiers 331, 332, 333.

The variable delay lines 321, 322, 323 (DL1, DL2, DL3) are described in detail in FIG. 4.

Moreover, a further transmission line is established by means of a further conductor connection 3004 established between an output amplifier 304 and an input amplifier 314.

It should be noted that the above-indicated conductors 3001, 3002, 3003, and 3004 represent conductor pairs.

The initially mentioned transmission lines are for example adapted for transmission of video signals, such as traditional RGB video signals.

R signals (red) may for example be transmitted via the conductor pair 3001, G signals (green) may for example be transmitted via the conductor pair 3002, and B signals (blue) may for example be transmitted via the conductor pair 3003.

The latter may be applied for the rest of the required KVM signals to be transmitted from the remote unit to the local unit, e.g. keyboard and mouse outputs. Evidently, several other types of user interface data and other types of data may be suitably transmitted via this or further dedicated transmission lines.

Basically, a test system according to the invention enables zero-phase transmission, or at least approximately zero-phase transmission, of video signals from one unit coupled to another via multi-conductor transmission cables, thereby avoiding the above-mentioned distortion of transmitted video signals.

Turning now to the inventive test system, the system comprises an upstream-located test oscillator 305. The test oscillator 305 may be activated for transmission of a test signal, typically a fixed frequency which is fully synchronized (=zero phased) with all RGB outputs.

At the downstream end of the connecting multi-conductor cable 300, a microprocessor arrangement 340 is arranged for controlling the variable delay lines 321, 322, 323. The microprocessor arrangement 340 is connected to a detection arrangement 341 arranged on the output of the delay lines 321, 322, 323, thereby facilitating control of the delay lines 321,322,323 by the microprocessor arrangement 340 on the basis of measurement or derivatives of such measurement established by the detection arrangement 341.

Hence, a usual calibration procedure may typically involve a first step of providing a test signal by means of the test oscillator transmitted from upstream to downstream.

Initially, the variable delay lines are typically neutral, i.e. all delay lines have zero delay.

The detection arrangement 341 may instantly measure the propagation delay between the conductor pairs 3001, 3002, 3003 when the multi-conductor is fed with the test signal. The microprocessor arrangement may then, based upon the measured propagation delays, adjust the variable delay lines accordingly, i.e. in such a way that the video signals received downstream are synchronized.

The synchronization is typically carried out by setting the variable delay line associated with the slowest (longest) conductor pair to zero or minimum delay and dedicating a longer delay line to the shortest conductor pair, thereby obtaining a "delay equalization" on the output of the delay lines at the downstream end.

When synchronization has been carried out, the settings of the delay lines are fixed and the calibration procedure terminated.

A broader and more basic understanding of the invention may be provided by adding a test oscillator upstream or downstream for establishment of a test signal. This test signal is propagated on the relevant multi-conductor cable which means that the multi conductor cable is actually available for KVM transmission. At the receiving end, the received signal is evaluated with respect to at least one propagation characteristic, i.e. the propagation delay.

On the basis of such measurement, the available delay lines are adjusted in such a way that the outputs of the multi-conductor cable and the connected adjustable delay lines are synchronized at the receiving end which results in synchronism. According to the invention, such synchronism may in practice be established automatically by adding a delay to the fastest transmission line and adding no or little delay to the slowest transmission line.

Typically, the delay line setting is expected to have a maximum of about 60–75 ns when dealing with for example Cat5/6 multi conductor cables. The skew delay factor in Cat 5E/6 cables is typically measured to around 20 ns/100 m.

It should be noted that the relevant delay times may even involve a delay adding of up to for example 200 or 300 ns in order to obtain calibration to standard Cat 5 UTP multi-conductors over very long distances, e.g. 1000 meters, depending on the requirements to the transmission.

These delay settings may be determined and established in several different ways within the scope of the invention.

According to a preferred embodiment of the invention, automatic delay setting should be performed by the system and require little or no operation by a human operator.

It should be noted that a small propagation delay may also typically be referred to as a phase.

Other suitable calibration procedures will be described below with reference to FIGS. 5a and 5b.

It should be noted that the different units within the calibration arrangement may be distributed differently in the extender system within the scope of the invention, as long as at least one of the delay lines between the remote unit and the local unit is automatically calibrated, thereby equalizing the propagation delay in the various, involved cable conductors. Hence, the number of parallel conductors or conductor pairs may of course vary within the scope of the invention from one to several conductors or conductor pairs.

It should be emphasized that the illustrated embodiment of FIG. 3 may principally be applied for several other purposes than the illustrated KVM extender system, although the invention features the particular advantages within this specific technical area. Evidently, other signal transmission systems may be compensated according the invention by automatically compensating the delay line properties in order to eliminate undesired mutual delays between the conductors.

FIG. 4a schematically illustrates the basic components of an analogue delay line utilized in a preferred embodiment of the invention.

The delay line comprises a cascade of capacitors C coupled by means of Coils L.

Moreover, the cascade comprises a number of taps 45, 46, 47, 48.

The taps may be applied for establishment of a delay line having certain desired delay properties by means of suitable switch control means.

FIG. 4b illustrates a possible switch configuration of a variable delay line DL of for example FIG. 3 according to an embodiment of the invention.

A number switches SWn—SWn+4 is applied for controlling the taps and thereby the effective length of the variable delay line DL.

The switches are SWn—SWn+4 and are all controlled by the microprocessor arrangement MP.

FIG. 5a illustrates a flowchart of a possible calibration procedure according to an embodiment of the invention, e.g. performed in the above-described circuit of FIG. 3.

Evidently, the flowchart is not reduced to handling only the illustrated system of FIG. 3. It may also be applied for several other applications of the invention. However, for explanatory purposes, the flowchart will be described with reference to FIG. 3.

Adjustment of the delay lines 3001, 3002, 3003 is initiated by a first calibration step 501.

In step 502, a test oscillator 305 is activated with the purpose at transmitting at least one reference signal via the conductors 3001, 3002, 3003.

The calibration loop now enters a first outer loop, in which all the conductor pairs 3001, 3002 and 3003 are mutually evaluated.

In step 503, the propagation delays of two conductors, e.g. the conductors or conductor pairs 3001 and 3002, are mutually compared by determining the conductor having the shortest delay, i.e. "which one is first".

It should be noted that the ranking may be performed in numerous ways within the scope of the invention, e.g. by comparison of more than two conductors or conductor pairs.

The initial test result is a delay ranking of the conductors.

In step 505, a check is made to determine whether the ranking is completed or not. If NOT, the procedure returns to step 503.

If all conductors have been ranked, a delay modification loop is entered in step 506.

Initially, selected (relevant) delay lines are adjusted in order to minimize the mutual delay, e.g. between two conductor pairs 3001, 3002. The minimization is typically obtained according to a predefined accepted tolerance level as illustrated in step 508. If compensation has not been achieved, the compensation iteration loop returns to step 506.

If compensation has been achieved, further conductors are selected for compensation in step 510 of the feed-back loop.

The manner in which the relevant delays line for adjustment are chosen in step 510 may vary. One way may involve the conductor or conductor pairs featuring the highest propagation delay being chosen as a "reference" conductor or conductor pair. If the conductor (or the conductor pair) 3002 of FIG. 3 is determined as the slowest conductor, the delay line 322 is set to zero, and the other delay lines 321, 323 are then adjusted through iterations until the conductor 3001 and the delay line 321 in combination feature a delay identical with—or almost identical with—that of the conductor 3001. The same procedure may be applied with respect to the conductor 3003 and the delay line DL3 323.

If all conductors have been compensated, the established delay line settings are stored in suitable storage means associated with a microprocessor(s) MP (the microprocessors are illustrated in FIG. 4b.) and the calibration process is terminated in step 512.

FIG. 5b illustrates a flowchart of another possible calibration procedure according to an embodiment of the invention.

Again, for explanatory purposes, the flowchart will be described with reference to FIG. 3. Evidently, other systems may be applied within the scope of the invention.

The calibration procedure is initiated in step 521.

In step 522, the test oscillator means 305 is activated.

In step 523, the mutual propagation delays of the conductor or conductor pairs 3001, 3002 and 3002 are established, e.g. by means of a specific delay measurement on each conductor pair.

These measured delay indicative parameters may then be directly converted into certain delay line settings.

Hence, if the conductor pair 3003 is the conductor showing the longest delay, the mutual delay between for example conductor pair 3003 and 3002 is measured to for example 15 nanoseconds and the mutual delay between the conductor pairs 3003 and 3001 is measured to for example 18 nanoseconds, the delay lines 322 and 321 may be adjusted to delay settings of approximately 15 nanoseconds and 18 nanoseconds, respectively.

Evidently, this "direct setting" of delay parameters may be confirmed or checked by further check routines establishing whether the desired properties have actually been achieved or not in the physical setup.

FIG. 6 illustrates a possible physical establishment of delay line coils according to an embodiment of the invention.

FIG. 6 illustrates an applicable delay line for implementation of an inexpensive embodiment of the invention.

The illustrated delay comprises a number of leads 62 arranged on a PCB. The individual leads on the PCB functionally forms an inductive component. The leads comprise signal in/out connecting points coupled to a multiplexer switch 60.

Moreover, the leads 62 are connected to a ground plane 64 via capacitors 63. Hence, the capacitors 63 and the inductive leads 62 form the delay lines of multiple delay line modules with at least two of the modules being formed by connecting point 61-inductor 62-capacitor 63 (to ground 64)-inductor 69-next connecting point 61.

The multiplexer 60 is controlled by means of control signals 67 provided by microprocessor means MP (not shown). Moreover, the multiprocessor comprises suitable input/output connectors 68.

The illustrated delay line modules may advantageously be integrated on/in a PCB, thus forming a very compact and inexpensive embodiment of the invention.

Evidently, several other embodiments of delay line configurations may be applied within the scope of the invention.

The invention claimed is:

1. Skew delay compensator comprising:
   at least two communication interfaces;
   at least two conductors connected to said communication interfaces;
   adjustable delay lines connected to said communication interfaces;
   detecting means for measuring propagation delay indicative parameters of said at least two conductors; and
   means for automatic adjustment of at least one of the adjustable delay lines on a basis of said measured propagation delay indicative parameters so that mutual delay between said at least two conductors is minimized,
   wherein the skew delay compensator further comprises at least one test oscillator configured for transmission of a test signal by at least two of said at least two conductors and at least one detector configured for measuring an absolute or relative delay-representing parameters associated with at least two of said at least two conductors.

2. Skew delay compensator according to claim 1, wherein said automatic adjustment is performed upon manual activation of said skew delay compensator.

3. Skew delay compensator according to claim 1, wherein said automatic adjustment is performed according to predefined calibration routines stored in said skew delay compensator.

4. Skew delay compensator according to claim 1, wherein said adjustable delay lines are adjusted by comparison iterations of mutual delays between said at least two conductors and said adjustable delay lines.

5. Skew delay compensator according to claim 1, wherein said adjustable delay lines are adjusted on a basis of specific propagation delays of at least two of said delay lines and the specifically measured propagation delays of at least two of said at least two conductors.

6. Skew delay compensator according to claim 1, wherein said delay lines are adjustable within a delay interval of at least approximately 0 to 50 nanoseconds.

7. Skew delay compensator according to claim 6, wherein said adjustable delay lines comprise a series of delay line modules comprising output taps and wherein said adjustable delay line properties are obtained by means of switches coupled to the taps said switches being controlled by at least one microprocessor arrangement on a basis of said measured propagation delay indicative parameters.

8. Skew delay compensator according to claim 7, wherein said delay line modules comprise at least one inductive component and at least one capacitive component.

9. Skew delay compensator according to claim 7, wherein at least two of said delay line modules feature a propagation delay of approximately 0.5 to 5 nanoseconds.

10. Skew delay compensator according to claim 7, wherein said delay line modules form an adjustable delay line which is adjustable within a certain desired range, preferably within a complete delay interval of at least approximately 0 to 100 nanoseconds, in intervals determined by the delay lines modules of approximately 0.5 to 5 nanoseconds, at a propagation delay of approximately 1 to 2 nanoseconds.

11. Skew delay compensator according to claim 1, wherein a predefined acceptable tolerance for minimizing the mutual delay between said at least two conductors is less than approximately 6 nanoseconds.

12. Skew delay compensator according to claim 1, wherein said at least two conductors comprise conductor pairs.

13. Skew delay compensator according to claim 1, wherein said at least two conductors comprise at least two different single conductors sharing at least one return conductor.

14. Method of compensating for skew delays in a multi-conductor comprising at least two conductors, said method comprising:
   transmitting a test signal by at least two of said at least two conductors by means of at least one test oscillator;

measuring absolute or relative propagation delay indicative parameters of said at least two conductors by means of at least one detector;

automatically minimizing mutual delay between said at least two conductors according to predefined, data processor executable routines on the basis of said propagation delay indicative parameters.

15. Method according to claim 14, whereby said routines comprise at least one predefined acceptable tolerance level.

16. Method according to claim 14, further comprising:

establishing the propagation delay indicative parameters of said at least two conductors; and adjusting at least one of at least two adjustable delay lines connected to said at least two conductors according to the predefined, data processor executable routines on a basis of said established propagation delay indicative parameters, so that the mutual delay between said at least two conductors is minimized.

17. Skew delay compensator according to claim 1, wherein said adjustable delay lines are adjustable within a delay interval of at least approximately 0 to 200 nanoseconds.

18. Skew delay compensator according to claim 1, wherein said adjustable delay lines are adjustable within a delay interval of at least approximately 0 to 300 nanoseconds.

19. Skew delay compensator according to claim 7, wherein at least two of said delay line modules feature a propagation delay of approximately 1 to 2 nanoseconds.

20. Skew delay compensator according to claim 1, wherein a predefined acceptable tolerance for minimizing the mutual delay between said at least two conductors is less than approximately 1 nanosecond.

* * * * *